(12) United States Patent
Ehlgen et al.

(10) Patent No.: US 9,102,265 B2
(45) Date of Patent: Aug. 11, 2015

(54) METHOD AND DEVICE FOR THE DISTANCE-BASED DEBOUNCING OF LIGHT-CHARACTERISTIC CHANGES

(75) Inventors: Tobias Ehlgen, Ravensburg (DE); Petko Faber, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 380 days.

(21) Appl. No.: 13/389,166

(22) PCT Filed: Aug. 5, 2010

(86) PCT No.: PCT/EP2010/061419
§ 371 (c)(1),
(2), (4) Date: Apr. 20, 2012

(87) PCT Pub. No.: WO2011/015625
PCT Pub. Date: Feb. 10, 2011

(65) Prior Publication Data
US 2012/0203427 A1    Aug. 9, 2012

(30) Foreign Application Priority Data

Aug. 7, 2009   (DE) .................. 10 2009 028 342
Aug. 7, 2009   (DE) .................. 10 2009 028 344

(51) Int. Cl.
*B60Q 1/08*     (2006.01)
*B60Q 1/14*     (2006.01)

(52) U.S. Cl.
CPC .............. *B60Q 1/143* (2013.01); *B60Q 1/085* (2013.01); *B60Q 2300/112* (2013.01); *B60Q 2300/305* (2013.01); *B60Q 2300/332* (2013.01); *B60Q 2300/3321* (2013.01)

(58) Field of Classification Search
CPC ................. B60Q 2300/052; B60Q 2300/112; B60Q 2300/312; B60Q 2300/3321; B60Q 1/085; B60Q 1/143
USPC ............... 701/49; 362/460, 466, 507; 315/82
See application file for complete search history.

(56) References Cited

U.S. PATENT DOCUMENTS 6,130,421 A * 10/2000 Bechtel et al. ............ 250/208.1
6,403,942 B1 *  6/2002 Stam ............................. 315/77
(Continued)

FOREIGN PATENT DOCUMENTS

CN           1602260       3/2005
DE         197 43 580      4/1999
(Continued)

OTHER PUBLICATIONS

International Search Report for PCT/EP2010/081419, dated Nov. 24, 2010.

*Primary Examiner* — John Q Nguyen
*Assistant Examiner* — Anshul Sood
(74) *Attorney, Agent, or Firm* — Kenyon & Kenyon LLP

(57) ABSTRACT

In a method for debouncing light-characteristic changes (e.g., streetlights, headlights of other vehicles), which are ascertained from image data of a camera for a vehicle, light-characteristic changes are identified in a continuous image sequence and a distance in time is determined between the light-characteristic changes. A spatial distance between the light-characteristic changes is determined with reference to the speed of the vehicle and from the distance in time between the light-characteristic changes. The debouncing is based on the spatial distance.

13 Claims, 3 Drawing Sheets

(56) References Cited

U.S. PATENT DOCUMENTS

| | | |
|---|---|---|
| 6,861,809 B2 | 3/2005 | Stam |
| 2004/0201483 A1 | 10/2004 | Stam et al. |
| 2005/0073853 A1 | 4/2005 | Stam |

FOREIGN PATENT DOCUMENTS

| | | |
|---|---|---|
| DE | 10 2006 055 906 | 6/2007 |
| DE | 10 2007 008 542 | 8/2008 |
| DE | 10 2007 051 268 | 4/2009 |
| DE | 10 2008 022 856 | 11/2009 |
| DE | 10 2008 060 565 | 6/2010 |
| EP | 2 052 911 | 4/2009 |
| JP | 59-63244 | 4/1984 |
| KR | 2007-0087297 | 8/2007 |
| WO | WO 2006/116960 | 11/2006 |
| WO | WO 2009/052788 | 4/2009 |

* cited by examiner

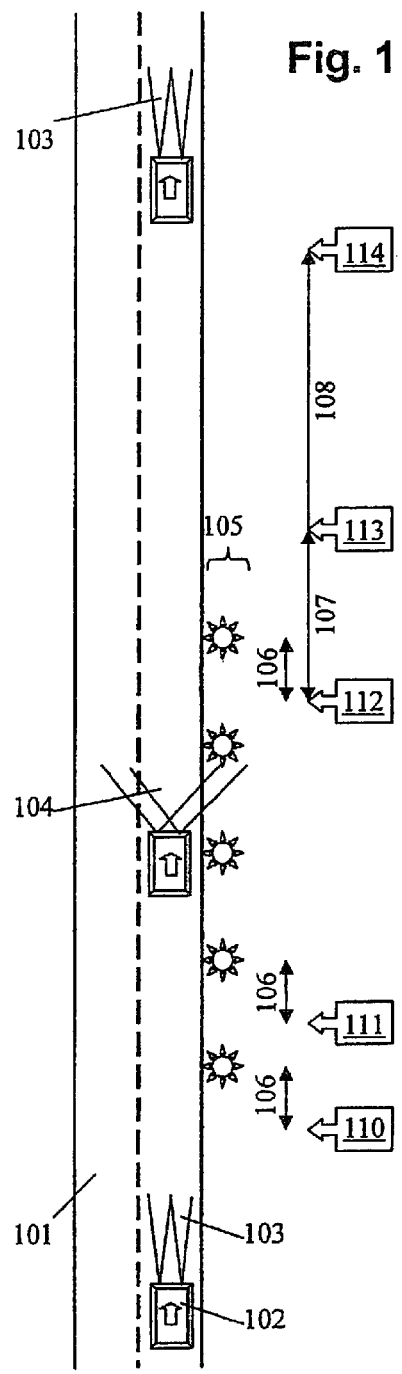

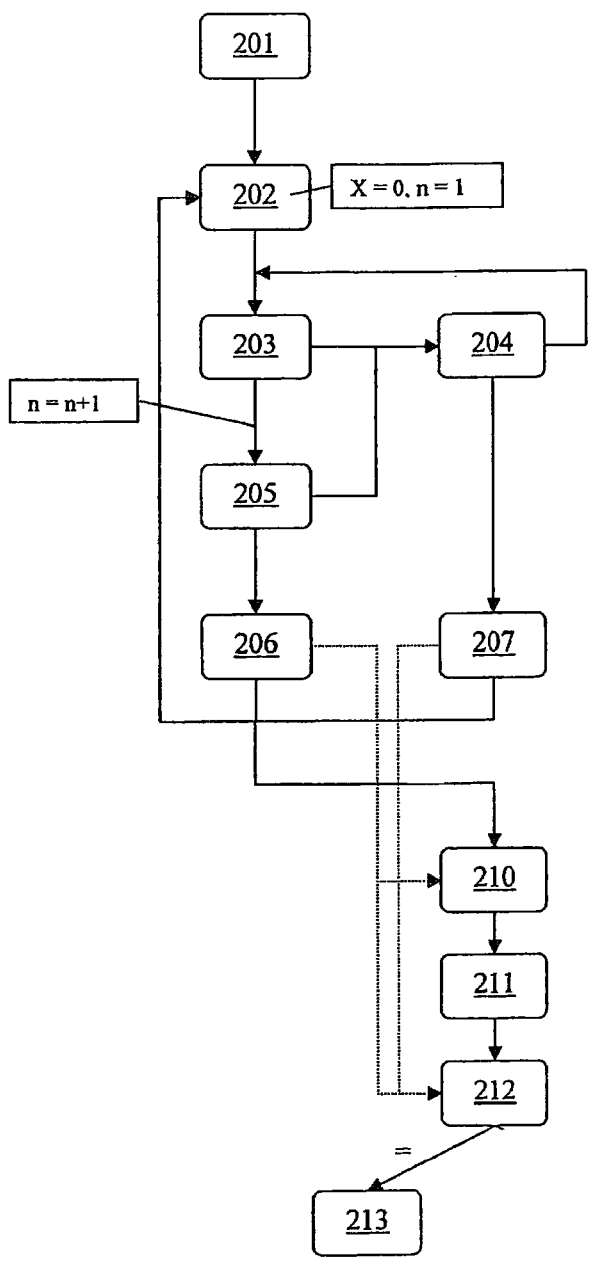

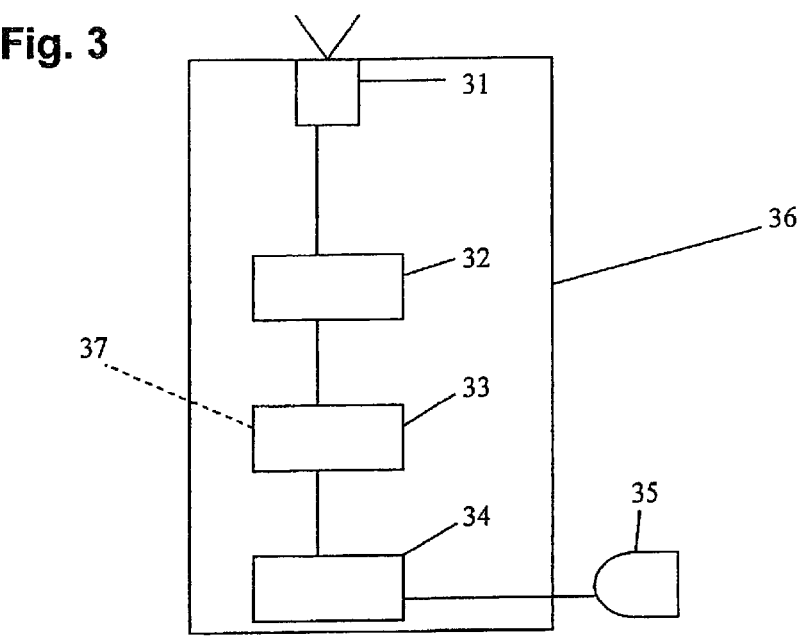

METHOD AND DEVICE FOR THE DISTANCE-BASED DEBOUNCING OF LIGHT-CHARACTERISTIC CHANGES

BACKGROUND OF THE INVENTION

1. Field of the Invention

The present invention relates to a method and a device for the debouncing of light-characteristic changes (e.g., streetlights, headlights of other vehicles), which are ascertained from image data of a camera for a vehicle, light-characteristic changes being identified in a continuous image sequence and a distance in time being determined between the light-characteristic changes, a spatial distance between the light-characteristic changes being determined with reference to the speed of the vehicle and from the distance in time between the light-characteristic changes, and the debouncing being based on the spatial distance, according to the species defined in the independent claims.

2. Description of Related Art

Systems which actively control the lighting of a vehicle (headlights) have been available on the market for some time. The aim of this measure is first of all, to offer to the driver an optimal view of the roadway in front of him/her, i.e., the relevant traffic situation, and secondly (of lower priority), to avoid obstructing the view of other road users or persons (pedestrians, bicyclists) or objects (building) to the greatest extent possible. Special systems which prevent the blinding of oncoming vehicles and automatically switch between high beam and low beam have been known for a longer time.

Systems which adapt the light-distribution pattern specially to the instantaneous driving situation, or to the area being driven through, have been known for a shorter time. Active headlight leveling control or swiveling headlights could be named as example for the first, and special light-distribution patterns such as freeway light or urban-light mode could be named for the second. The light-distribution pattern of the urban-light mode manifests itself through a large, wide illumination characteristic which makes it possible to see intersections better and to illuminate the sidewalks, since increasingly road users are stopping especially in municipal (that is, populated) areas. Such a headlight, which permits a variable light characteristic owing to suitable control, is described in published international patent application document WO 2006/116960 A1, for example.

In order to be able to control such headlights correctly and automatically, the vehicle must have means capable of determining the instantaneous driving situation or the whereabouts of the vehicle. For various purposes, there are already such systems which detect objects at night with the aid of a camera (e.g., dual purpose camera (DPC) or multi-purpose camera (MPC)).

The U.S. Pat. No. 6,861,809 B2 describes detecting whether a vehicle is in an urban area based on the light intensity that is measured by a special intensity sensor. If the intensity of the ambient light is high, it is assumed that the vehicle is in a lighted area and thus in the city, and activation of the urban-light mode is recommended. In particular, these ambient-light sensors detect whether the light has a non-discernable alternating-voltage characteristic attributable to the power-line frequency. This method proves unsuccessful when LED streetlights are used, since they have their own clocking or no clocking at all.

Moreover, it is known to switch a certain light-distribution pattern on or off with the aid of a speed threshold, that is, when the vehicle exceeds or falls below a specific speed. In particular, a possible urban-light mode is deactivated when a specific speed is exceeded.

In column 12, lines 17-21 of U.S. Pat. No. 6,861,809, the use of an imaging sensor is mentioned briefly, by which streetlights are identified and the urban-light mode is activated when a specific number of streetlights are detected within a certain time. This teaching does not consider whether a vehicle travels a great distance within this time span, and therefore has already driven some distance in the city before the urban-light mode is activated. The consideration of the vehicle speed mentioned at this point relates to the previously described speed threshold, in response to the exceeding of which, the urban-light mode is generally switched off, and the standard light is switched on.

For example, known light-distribution patterns have the self-explanatory designations of freeway light, bad-weather light or urban-light mode. Here, in most cases, standard light is understood to be low beam or high beam.

A street-lighting unit is understood to be a light source which illuminates the road and/or is able to be perceived by the camera of the vehicle. For the present invention, it must fulfill the purpose to be characteristic for a lighted area. Typically, it means streetlights or lamps, especially those which illuminate a street or a street lined with houses over a greater length, and not only at certain points for hazardous situations. This rules out lights which are not used primarily for this purpose, especially those which are mobile, such as headlights of other vehicles. Light sources (active or passive) may also be suitable for this, such as traffic lights, other signal lights or reflections from traffic signs. For example, a frequent appearance of traffic lights indicates a lighted and built-up area, as well.

A light characteristic change is the modification of an instantaneous light situation (light variation), that is, a change in the strength, distribution, color, frequency, modulation (e.g., AC power supply voltage) of the light incoming from the surroundings and falling on the vehicle, i.e., the detecting sensor (light sensor, camera). The characteristic may be determined by certain light variations, for example, by the change in the incidence of light when passing an oncoming vehicle, or the light change already described, when passing stationary objects such as streetlights, for example. A characteristic may also be shaped by more than one light change, for example, a certain number of light changes within a specific time, or a sequence of different light colors. One possible characteristic may be a light-dark change such as upon exiting a lighted tunnel; another characteristic may be a dark-light-dark change, such as when passing by a streetlight. Such a passing may also be interpreted as 2 characteristic changes: dark-light and following that, light-dark.

The term "stationary state" of objects is understood to be their state of being fixed in place, that is, the stationary state of the object is given when the object is a stationary object.

In the present case, the term debouncing is used in such a way that, to be correct, it would have to mean hysteresis. The Wikipedia encyclopedia defines this as follows: "Hysteresis characterizes a system whose output variable is not solely a function of the type of input variable, but also of the history which the input variable had. The system thereby demonstrates path dependency."

Light characteristic changes are processed as a function of the occurrence of previous light characteristic changes and states of a system influenced by them (e.g., present headlight adjustment).

Traditionally, a debouncing is known in the case of a switch which can generate several unwanted bounce pulses during the closing or opening operation. For example, a Schmitt trigger, which has a hysteresis functionality, may provide a corrective for this, in that after a last pulse, it waits a defined time to see whether a further pulse will occur. If not, the switching operation is regarded as complete and ended and is output/signaled.

Another type of debouncing may be the waiting for a certain number of events before an action is carried out and the debouncing is ended.

In like manner, a certain time may be waited after a light characteristic change, in order, for example, to detect a further (or n further) streetlight(s), or to output a signal (e.g., to activate a special light-distribution pattern of a headlight). This "waiting according to the time" is known from the related art; therefore, the present invention deals with the waiting and debouncing according to the distance or the speed, as explained below.

The terms area and region are to be used synonymously in the present case; in particular, a municipal area denotes an urban area, synonymous with an inner-city or populated area of an urban neighborhood, however, not restricted to city limits or municipality boundaries, but rather to communities, or populated or busy areas in general.

BRIEF SUMMARY OF THE INVENTION

The method and the device of the present invention have the advantage over the related art that it is possible to assess more accurately whether an area is lighted, and that this information is ascertained more quickly. Thus, it is proposed to judge an area as lighted when at least two street-lighting units appear within a certain distance. The average distance between streetlights in Germany is approximately 25 to 30 m. Thus, for example, a threshold of 40 to 50 m may be selected in order to classify the spacing of two streetlights as typical for lighted areas. A classification may also be made only when more than two streetlights are detected within a certain distance, or a probability for the existence of a lighted area is ascertained based on the number of streetlights detected. Therefore, in the first place, the identification of the lighting of an area is determined after a certain number of streetlights, and thus a certain distance covered, and not only after a certain time, at which the lighting of an area is possibly first recognized when the vehicle has already traveled an ample distance into the lighted area because of high speed. Secondly, the lighting of an area may also be determined when the vehicle is traveling too slowly to detect a certain number of streetlights within a specific time.

Conversely, the evaluation of the area as lighted may be reversed when the streetlights no longer appear at this specified distance from each other. Appropriate methods of pattern recognition or other suitable methods, which are not described in greater detail within the scope of this invention, may be carried out to look into the image data to extract information for a street-lighting unit.

Advantageously, the spatial distance between street-lighting units may already be determined from the image data of a single image. In simplified terms, geometrical methods may be used for this, which measure the distance between the street-lighting units. The evaluation of a plurality of images is not absolutely necessary here, however, an iterative or additional evaluation of an image sequence is possible, as well. Typically, using present-day systems, three streetlights are sometimes detected in advance in a single image. Data of a stereo camera, that is, strictly speaking, two or more images which were recorded at the same instant and from which depth information of the objects (streetlights) may be calculated, may also be regarded as a single image.

For example, if several streetlights are not discernible in a single image, then advantageously, a continuous sequence of images may be used to detect the streetlights, the distance in time since the appearance of the previous street-lighting unit being determined. Since the first instant a streetlight is detected may be dependent on local occurrences, as well as environmental influences such as weather, the detection does not always take place at the same distance to (in front of) the vehicle. Thus, for example, the detection of the second (or further) streetlight could be delayed to such an extent that the threshold value of the distance is not reached in the evaluation, and an area is mistakenly classified as lighted or not lighted. In order to solve this problem, the image information may be evaluated in such a way that a streetlight is only judged as detected starting from a certain point in the image or as of a certain distance from the vehicle, even though an optical recognition would usually be possible earlier. In this manner, it is also possible to exactly define the distance at which a streetlight must be located in front of the vehicle, and possibly from what distance in front of the at least one further streetlight the evaluation as to whether an area is lighted takes place. This method may be carried out alternatively, or perhaps additionally, with the aid of a rearward-looking camera. Thus, in particular, the plausibility of the change between lighted and unlighted area may be checked with the aid of the rearward-directed camera together with the forward-directed camera, i.e., their image data.

Advantageously, the spatial distance between the street-lighting units is ascertained from the determined distance in time in the continuous image sequence by using the speed of the vehicle in order to calculate it. In the simplest case, this result is ascertained by the formula distance between two streetlights=vehicle speed*time difference between the appearance of the two streetlights Consequently, the stretch traveled is the decisive assessment variable. If desired, the plausibility of the distance may also be checked via other methods; for example, geometrical methods of the image evaluation.

Advantageously, a debouncing may take place which makes it possible to more precisely detect a lighted area. In this case, in a first step, a first street-lighting unit is detected; in a second step, a second, i.e., depending on the applicative desire, also an nth street-lighting unit is detected; in a third step, the distance in time or space between these at least two street-lighting units is determined; and in a fourth step, it is checked whether this distance lies below a defined threshold. Alternatively, as of the appearance of the first street-lighting unit, a time meter or distance meter may also be started which, only upon reaching the time or distance threshold, checks whether at least one (or n-1) further street-lighting unit(s) is/have appeared. The debouncing described is useful in order to avoid switching the urban-light mode back and forth, which could give the impression of flickering, or misleadingly, a headlight flasher.

Comparably, a debouncing would also makes sense when there would be switching back and forth between high beam and low beam in response to oncoming traffic and the brights would be put on again immediately after an oncoming vehicle had passed without checking whether there are further vehicles following, since otherwise a toggling or flickering could occur.

Generally in the case of light changes, regardless of their origin, it is conceivable to use the distance as variable with respect to the debouncing for the light-control function, instead of the time.

Advantageously, this debouncing may also take place upon resetting the evaluation as to whether an area is lighted, that is, upon driving out of a lighted into an unlighted area. In this case, a certain time or a certain distance would be waited after the appearance of a last street-lighting unit, and if no further (i.e., nth) street-lighting unit appears within this distance, the area is assessed as unlighted. In the case of debouncing by the use of distance, it is advantageous that especially at high speed, it is possible to switch quickly to normal light again, and therefore to keep interurban driving using urban-light mode and suboptimal lighting as little and brief as possible.

Moreover, a debouncing of the detection of a lighted area may also be carried out using parameters different from a debouncing of the detection of an unlighted area; for example, a lighted area may already be classified after two streetlights, but an unlighted area may first be classified after the absence of a plurality of streetlights.

Advantageously, the change of the threshold mentioned or of the distance mentioned may also be a function of environmental conditions; this threshold may also be variably adjusted while in driving mode. Thus, the typical distance between streetlights may change depending on the state/country being driven through, or perhaps situations are governed, such as the deactivation of every second streetlight because of energy-saving measures in many communities. With respect to the last case mentioned, for example, the clock time may be considered as an additional environmental parameter, according to which, for example, from 10 p.m. till 6 a.m., the threshold value for the distance between streetlights is doubled. However, a limit may possibly then also be reached, after which the area must objectively be assessed as no longer sufficiently lighted, so that standard light should be used in the inner city, as well.

It is advantageous that the information as to whether the area currently being driven through is an inner-city area may be derived from the degree to which the streets are lighted, since, inter alia, there are appropriate regulations for stationary lighting of that kind, and many areas in many states/countries are planned accordingly. Instead of that, a degree of probability that it is an inner-city area could also be deduced as a function of the degree of lighting or the number of streetlights detected. For example, the appearance of one streetlight may indicate a probability of 30%, and as of the occurrence of three streetlights, may indicate a probability of 100% that one is in an urban area.

In addition to the relationship between the lighting of an area and the fact of the area being urban, further indications or parameters may advantageously be taken into account to back up the thesis that the vehicle is in the inner city. To that end, signals from other sensors may be evaluated and lead to an assessment in a suitable evaluating logic, i.e., software. In particular, the map data, e.g., of a navigation system, presents itself to easily read out the information about an inner-city area from its database. In this manner, a correct location of the vehicle could be determined even if in some regions (possibly known to the map), the street-lighting units are switched off (temporarily). On the other hand, together with the method described, it is possible to compensate for the absence, i.e., a failure of the navigation system or a missing update of the map data.

Furthermore, for example, the following criteria may indicate that the vehicle is in a lighted area, that is, an urban area, and whether activation of the urban-light mode is advised: The current traffic density, the information from a brightness sensor, the illumination due to non-stationary street-lighting units, especially the flowing traffic, the detection of pedestrians, lane-line systems and curve-detection systems, information exchange via Car to X (C2X) or a driving profile of the vehicle, i.e., the driving style of the driver. Information about the location or the traffic situation may be communicated from other vehicles or, for example, by traffic signs (C2X). In addition to being expressed in the speed, the driving profile is expressed, for instance, in the steering angle or the yaw rate; for example, if it is great, thus, sharp steering angles are being executed, this is an indication for a built-up area.

It is advantageous if only the street-lighting units are taken into account which are also characteristic for an inner-city area. Thus, a few exceptions with respect to stationary lighting are conceivable, especially the lighting of crossings as occur on supraregional highways, railway crossings, exit ramps or junctions or advertising lighting. Likewise, it may be useful in carrying out the method to consider only the streetlights on one side of the road, especially those on the side of the traffic lane. Optionally, using expanded methods, streetlights of intersecting roads/streets may be detected, which are then not taken into account.

It is advantageous to use the method for light control, a special light-distribution pattern (e.g., urban-light mode) being implemented in an area assessed as urban, and the standard light or another light-distribution pattern being activated, or, for example, the urban-light mode being deactivated in an area outside of it, that is, upon change to an interurban area. Optionally, instead of or in addition to this, a flexible headlight leveling control may also be carried out, the headlight range being reduced in an urban area and being increased in an interurban area, possibly taking further parameters such as oncoming traffic into consideration, as well. The deactivation of the urban-light mode, for example, may lead to the activation of the standard light, or perhaps to other light-distribution patterns, for instance, to that which was active prior to the activation of the urban-light mode, or to another which seems appropriate based on the present driving situation. Going beyond the light control, alternatively or additionally, the information about an inner-city area may also be used to activate or deactivate other systems in the vehicle or outside of the vehicle, for instance, the pretensioning of occupant protection systems such as a pedestrian impact system, since a collision with a pedestrian is more likely in an urban area than outside.

It is advantageous that beyond the detection of a certain number of streetlights within a specific time or distance, what is termed a forerun function or follow-up function is used to more precisely verify the assessment. In this forerun or follow-up, i.e., in a further (external) debouncing, it is checked whether the result of the assessment, e.g., whether an area is lighted, whether an area is a municipal area or whether a certain light-distribution pattern should be activated, exists during the forerun or follow-up phase, that is, remains valid. In this manner, it may be assumed with greater certainty that the assessment is correct.

It is advantageous if the behavior of the vehicle at very slow speeds does not change with respect to its light characteristic. At a very slow speed, the driver would perceive a changing light characteristic, especially putting on the brights, as surprising and inappropriate. Therefore, it presents itself that at very slow speeds, the light characteristic is either not changed over, or is not changed over in the direction of a light characteristic expressed as putting on the brights. Depending on the application, if the speed threshold is exceeded again, the customary light pattern may be set. To carry out the debouncing between the appearance of the streetlights based on the distance instead of the time offers the advantage, especially when driving slowly, that, if applicable, the urban-light mode is retained for a long time, as well.

In general, standard light may advantageously be retained, or there may be a switchover to standard light when a specific speed threshold is exceeded. For example, a typical threshold is 80 km/h, at which it is assumed that no meaningful use can be made of the advantages of the urban-light mode at such high speeds, and a light characteristic which facilitates fast driving with the aid of optimal and longer-distance (instead of broad) illumination is more suitable. Activation of the urban-light mode may thereby also be avoided when an intercity road, especially an expressway, is involved. For example, in some states/countries, the parkways are also lighted. It may be possible to distinguish between an inner-city area and such a lighted expressway, based on the distance between streetlights.

Another refinement of the method may be used to determine, with the aid of image data from at least one camera (31) for vehicle (102), whether an area in which a host vehicle (102) is located is lighted, for the purpose of light control (34) of the vehicle, at least two (205) stationary street-lighting units (105) being identified on the basis of the image data, and an area being assessed as lighted (206) when these at least two street-lighting units (105) have a spatial distance from each other within defined limits (107, 204).

A further specialization is characterized in that the spatial distance is determined from the image data of a single image.

Another alternative specialization is characterized in that an appearance of further street-lighting units (105, 111) is recognized in a continuous image sequence, and the distance in time since the appearance of the preceding street-lighting unit (110) is determined.

A further specialization is characterized in that the spatial distance between these street-lighting units is determined from the distance in time, with reference to the speed of vehicle (37).

Another specialization is characterized in that, if there is a drop below a time threshold or a spatial distance threshold (204, 205) between the appearance of a first (110) and a further (111) street-lighting unit, an area is assessed as lighted (206).

A further specialization is characterized in that if a time threshold or a spatial distance threshold (107, 204) as of the appearance of the first or last street-lighting unit (112) is exceeded, without the appearance of a further street-lighting unit, an area is assessed as not lighted (207, 113).

Another specialization is characterized in that the time threshold or spatial distance threshold (204) is adjusted variably on the basis of environmental conditions.

A further specialization is characterized in that it is assumed that the lighted region is a municipal area, that is, an area within a community.

A further specialization is characterized in that, to determine whether an area is urban or interurban, the information as to whether the area is lighted is linked to other information sources.

Another specialization is characterized in that only street-lighting units (105) are taken into account which are typical for an urban area.

A further specialization is characterized in that the urban-light mode is activated when the area has been determined as urban (111), and the standard light is activated when the area has been determined as interurban (113, 114).

Another specialization is characterized in that an assessment with respect to the lighted area or urban area, or activation of urban-light mode (111) or standard light (114) is only carried out when the assessed state has persisted a certain time or distance traveled (108, 211).

A further specialization is characterized in that when driving slowly below a defined speed threshold, the activated urban-light mode is not deactivated, even though in the meantime, the area has been determined as interurban.

Another specialization is characterized in that, in response to the vehicle exceeding a defined speed threshold, the area is determined to be unlighted or/and interurban, or/and the urban-light mode is deactivated.

Another embodiment of the device may be used to determine whether an area in which a host vehicle (102) is located is lighted, having first means or an interface for receiving image data (31), and second means which are provided for detecting stationary street-lighting units (32) or for the receipt of this information, these second means (32, 33) identifying at least two stationary street-lighting units in at least one image, or an image sequence, of the image data from the first means, and making an assessment as a function of spatial distance (107), and transmitting the result or control (34) of headlights (35) via an interface.

BRIEF DESCRIPTION OF THE DRAWINGS

FIG. 1 shows a vehicle entering into and exiting a lighted area.

FIG. 2 shows a flowchart of one embodiment of the method.

FIG. 3 shows a block diagram of one possible system configuration having a camera.

DETAILED DESCRIPTION OF THE INVENTION

FIG. 1 shows a scene on a road 101 on which a vehicle 102, driving from the bottom upward, is entering into a lighted area characterized by streetlights 105. At the beginning, the vehicle is driving using standard light 103, while as of a distance 106 before the first streetlight, the system detects it at the instant of passing over point 110. Likewise, at a distance 106 before the second streetlight, this second streetlight is detected at point 111, and at this juncture, urban-light mode 104 is switched on. After driving through the lighted area, at point 112, the system detects what for the moment is the last streetlight; at this juncture, the system does not yet know that it is the last streetlight. When no further streetlight has been detected in a debouncing distance 107, at point 113, the area is no longer assessed as being lighted. After a follow-up time or a follow-up distance 108, at point 114, urban-light mode 104 is again switched to standard light 103.

FIG. 2 shows the sequence of one form of the method, in which, in an entry situation 201, the area is assessed as not yet lighted or is not assessed at all. In step 202, initial values are set, for example, the distance traveled, i.e., distance "X" between two streetlights, is set to zero, and the counter "n" for the number of streetlights is set to 1. In step 203, it is checked whether the nth streetlight has been detected. If this is not the case, in a step 204, it is checked whether distance X has already exceeded a specific threshold. This threshold has already been specified, and indicates a typical distance of two or n streetlights, plus, if desired, a safety offset. So long as this threshold has not been exceeded, the method continues with step 203 of the detection of the nth streetlight. If an nth streetlight has been detected, in step 205, the streetlight counter is increased by 1, and it is checked whether the required number of detected streetlights has been reached. If this is not yet the case here, the increase of the counter is retained, and the method is continued with step 204. If the number of streetlights was reached, in step 206, an assessment of a lighted area is carried out. Should the distance threshold have been exceeded in step 204, an identification of an unlighted area is carried out. Up to here, FIG. 2 illustrates one possible realization of the basic idea of the present invention.

A possible forerun or follow-up function is subsequently described. In step 210, the assessment results of steps 206 and 207, respectively, are stored temporarily in a memory. Thereupon, starting from a step 211, a certain time or distance is waited corresponding to the desired forerun or follow-up time, so as to compare the stored assessment results to the currently existing assessment results in step 212. Should these results be the same, then in a step 213, the assessment as urban area or non-urban area and the activation of the urban-light mode or the standard light are carried out. In the event the results are not the same, other assessments are carried out accordingly, for example, the retention of the present assessment or the present light-distribution pattern.

FIG. 3 shows a schematic illustration of a multi-purpose or dual purpose camera 36 which attains the image data with the aid of a camera or lens system 31 and extracts the streetlights from the image data with the aid of the vehicle and object-detection algorithm 32. The evaluation with regard to the number of streetlights within a certain distance or time is now carried out in a signal evaluation unit 33. To that end, input signals 37, such as the vehicular speed or the time are taken into account. A headlights control unit (ASF control unit) 34 now controls headlights 35 depending on the information as to whether the vehicle is in the inner city. The components of the device may also be grouped separately, in particular, for example, camera lens system 31 may be separate and connected to evaluation control unit 36 via an interface.

What is claimed is:

1. A method for debouncing at least two light-characteristic changes ascertained from image data of at least one camera for a host vehicle, comprising:
   identifying the at least two light-characteristic changes in a continuous image sequence of the at least one camera;
   determining a separation in time between the at least two light-characteristic changes;
   determining a spatial distance between the at least two light-characteristic changes based on the separation in time between the at least two light-characteristic changes, with reference to a speed of the vehicle;
   debouncing the at least two light-characteristic changes based on the spatial distance; and adjusting a light mode of the host vehicle based on the debouncing of the at least two light-characteristic changes.

2. The method as recited in claim 1, wherein, when a spatial distance between a first light-characteristic change and a further light-characteristic change one of exceeds or falls below a spatial distance threshold, the debouncing is brought to an end and an assessment is carried out.

3. The method as recited in claim 2, wherein the light-characteristic changes are caused by the vehicle passing one of (i) stationary objects or (ii) light sources.

4. The method as recited in claim 2, wherein the adjusting of the light mode of the host vehicle further comprises using the assessment to judge whether an area in which the vehicle is located is an urban area, and wherein an urban-light mode is activated when the area has been determined to be an urban area, and wherein a standard light mode is activated when the area has been determined to be non-urban.

5. The method as recited in claim 4, wherein the activation of one of the urban-light mode or the standard light mode is carried out only when an assessed state lasts a specified distance traveled.

6. The method as recited in claim 2, wherein the spatial distance threshold is adjusted on the basis of environmental conditions.

7. The method as recited in claim 2, wherein the debouncing is further based on the speed of the vehicle.

8. The method as recited in claim 2, wherein the assessment is communicated to other control systems of the vehicle for further evaluation.

9. The method as recited in claim 1, wherein in the case of one of (i) known distance between objects or (ii) known distance between light sources, one of speed or stationary state of the objects or the light sources is determined, with reference to the speed of the vehicle.

10. The method as recited in claim 1, wherein the light-characteristic changes are caused by one of (i) moving objects or (ii) light sources, and wherein one of (i) the spatial distance between the objects or (ii) the spatial distance between the light sources is determined based on respective speeds of one of the objects or the light sources.

11. The method as recited in claim 1, wherein in addition to the spatial distance between the at least two light-characteristic changes, the debouncing is carried out based on a distance traveled by the host vehicle after the light-characteristic changes.

12. The method as recited in claim 11, wherein the light-characteristic changes are caused by oncoming vehicles, and wherein after the debouncing on the basis of the distance traveled by the host vehicle after a last light-characteristic change, a headlight control for the host vehicle is altered.

13. A device for debouncing at least two light-characteristic changes, the device located in a host vehicle, comprising: an interface unit for receiving image data of at least one camera for a vehicle; and a detection unit for detecting light-characteristic changes, wherein the detection unit (i) identifies at least two light-characteristic changes in an image sequence of the image data received at the interface unit, and (ii) determines a spatial distance between the at least two light-characteristic changes based on separation in time between the at least two light-characteristic changes, with reference to a speed of the vehicle host; wherein debouncing of the at least two light-characteristic changes is based on the spatial distance; and wherein a light mode of the host vehicle is adjusted based on the debouncing of the at least two light-characteristic changes.

* * * * *